(12) United States Patent
Janakiraman et al.

(10) Patent No.: US 10,574,481 B2
(45) Date of Patent: Feb. 25, 2020

(54) HETEROGENEOUS CAPABILITIES IN AN OVERLAY FABRIC

(71) Applicant: Cisco Technology, Inc., San Jose, CA (US)

(72) Inventors: Rajagopalan Janakiraman, Cupertino, CA (US); Ronak Desai, Fremont, CA (US); Kalyan Ghosh, Saratoga, CA (US); Balaji Muthuvarathan, Boomianpet (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/042,265

(22) Filed: Jul. 23, 2018

(65) Prior Publication Data

US 2020/0028711 A1  Jan. 23, 2020

(51) Int. Cl.
H04L 12/46 (2006.01)
H04L 12/933 (2013.01)
H04L 12/947 (2013.01)
H04L 12/931 (2013.01)
H04L 29/12 (2006.01)

(52) U.S. Cl.
CPC ...... H04L 12/4633 (2013.01); H04L 49/1507 (2013.01); H04L 49/25 (2013.01); H04L 49/357 (2013.01); H04L 61/6022 (2013.01)

(58) Field of Classification Search
CPC . H04L 45/00; H04L 29/0653; H04L 49/3009; H04L 47/10; H04L 29/06
USPC ........................................................ 370/392
See application file for complete search history.

(56) References Cited

U.S. PATENT DOCUMENTS

| | | | |
|---|---|---|---|
| 7,701,877 B1 * | 4/2010 | Rozenman | H04L 41/12 370/254 |
| 2008/0080509 A1 * | 4/2008 | Khanna | H04L 12/4641 370/392 |
| 2013/0114601 A1 * | 5/2013 | Branscomb | H04L 45/00 370/392 |
| 2013/0301472 A1 * | 11/2013 | Allan | H04L 45/66 370/254 |
| 2015/0341262 A1 * | 11/2015 | Shiraki | H04L 45/74 370/410 |
| 2016/0065618 A1 * | 3/2016 | Banerjee | H04L 63/20 726/1 |

* cited by examiner

Primary Examiner — Gbemileke J Onamuti
Assistant Examiner — Sanjay K Dewan
(74) Attorney, Agent, or Firm — Merchant & Gould P.C.

(57) ABSTRACT

Heterogeneous capabilities in an overlay fabric may be provided. First, it may be determined that a first link and a second link support a feature. Then the first link and the second link may be traversed with traffic between a host in a first Endpoint Group (EPG) connected to a first leaf switch and a second host in a second EPG connected to a second leaf switch when a topology preference for the feature is indicated for the traffic.

17 Claims, 4 Drawing Sheets

HETEROGENEOUS CAPABILITIES IN AN OVERLAY FABRIC

TECHNICAL FIELD

The present disclosure relates generally to datacenter overlay fabric.

BACKGROUND

Software-defined networking (SDN) is an approach to cloud computing that facilitates network management and enables programmatically efficient network configuration in order to improve network performance and monitoring. SDN is meant to address the issue that the static architecture of traditional networks is decentralized and complex while current networks require more flexibility and troubleshooting. SDN centralizes network intelligence in one network component by disassociating the forwarding process of network packets (i.e., the data plane) from the routing process (i.e., the control plane). The control plane comprises one or more controllers that are considered to be the brain of an SDN network where the intelligence is incorporated.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
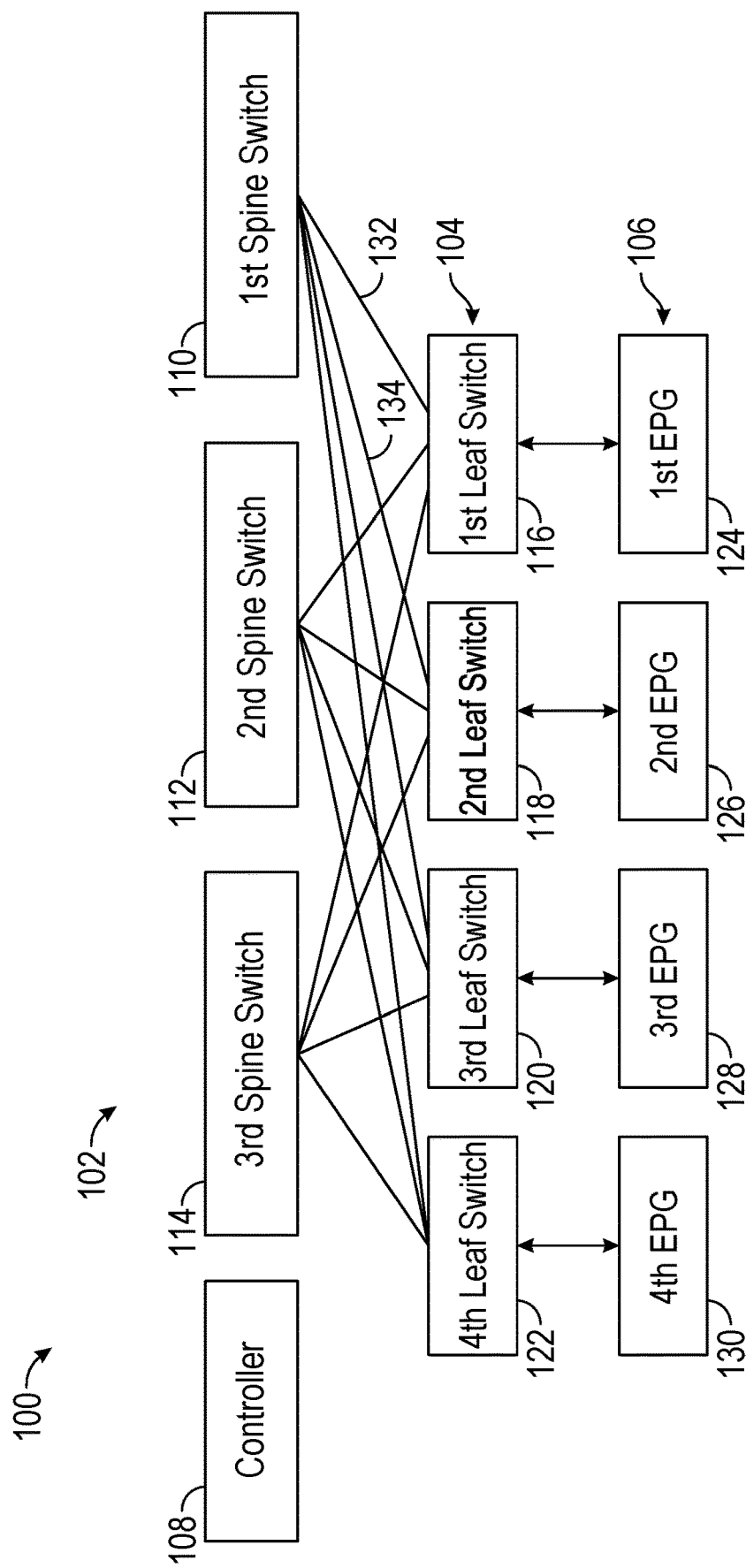
FIG. 1 is a block diagram of a networking system.

Heterogeneous capabilities in an overlay fabric may be provided. First, it may be determined that a first link and a second link support a feature. Then the first link and the second link may be traversed with traffic between a host in a first Endpoint Group (EPG) connected to a first leaf switch and a second host in a second EPG connected to a second leaf switch when a topology preference for the feature is indicated for the traffic.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In the existing overlay based data center spine leaf architectures, a single overlay topology may be used for different categories of the underlay traffic. Overlay topology may provide load balancing, redundancy, multicast, and Quality-of-Service (QoS) services for example. Underlay QoS may be mapped to overlay QoS and load balancing while redundancy functions may be common to all underlay traffic. The spine switches, which may perform the overlay function, may need to provide the same overlay feature set to allow for load balancing and redundancy to work seamlessly for the underlay traffic. This may pose challenges when new functionalities are added to the switches in the overlay topology and different types of underlay traffic may require different services in the overlay Network.

As the deployments start expanding to accommodate feature and scale, topology diversity may be inevitable, where spine/overlay switches may have differing functional capabilities between themselves. One example of may be Media Access Control Security (MACSEC) link encryption on spine Links. MACSEC is an IEEE standard for security in wired Ethernet Local Area Networks (LANs). This functionality may be provided in newer, more modern spine and leaf switches. Because, the overlay topology may be load balanced for underlay traffic, traffic may go over a mix of both encrypted and unencrypted links. This may defeat the purpose of having some of the links carrying encrypted traffic. Accordingly, one way to support MACSEC is for all the spine switches in an existing deployment to be replaced with the newer spine switches that support MACSEC.

Encryption, however, may only be required for certain tenants or certain Endpoint Groups (EPGs) (e.g., certain confidential services in a shared tenant infrastructure), but may not be required for other sets of tenants or EPGs. Consequently, it may not be necessary for all spine links to provide link level encryption. Accordingly, upgrading all the spine switches to cater to a smaller set of underlay traffic may be costly and thus may be detrimental to deploying this feature.

Furthermore, other newer features like Multi Site/Remote Leaf connectivity, VxLAN encryption (INS Sec) may also need newer, more modern switches that may implement these functions in hardware. The previous generation switches, which may currently be used to provide InterPod POD connectivity for MultiPod features, may no longer be connected to the Inter POD network if the same network is also used for Multi-Site or Remote leaf connectivity. In this case, the previous generation switches may have to be replaced with newer switches that support both Multipod and Multi Site functionality because the underlay traffic may not be able to differentiate between the two types of switches based on capability set.

Another example of the aforementioned problem may comprise supporting Fiber Channel (FC) over VxLAN. For this feature, certain enhancements may be required in the switches like bandwidth/QoS guarantees and path isolation. Also, topology isolation may be desired only for certain class of traffic based on functional and service filters. For example, Ethernet and FC underlay traffic may not want to share the common overlay topology. In addition, only certain tenants may want end-to-end encryption and may be willing to pay for this higher QoS.

FIG. 1 is a block diagram of a networking system 100. Networking system 100 may comprise an Application Centric Infrastructure (ACI) fabric disposed within a data center that my apply SDN. As shown in FIG. 1, system 100 may comprise a plurality of spine switches 102, a plurality of leaf switches 104, a plurality of EPGs 106, and a controller 108. Plurality of spine switches 102 may comprise a first spine switch 110, a second spine switch 112, and third spine switch 114. Plurality of leaf switches 104 may comprise a first leaf switch 116, a second leaf switch 118, a third leaf switch 120, and a fourth leaf switch 122. Plurality of EPGs 106 may comprise a first EPG 124, a second EPG 126, a third EPG 128, and a fourth EPG 130.

As shown in FIG. 1, the network switches of the first data center may comprise a shared physical network infrastructure and may be organized into two or more stages. Plurality of leaf switches 104 may comprise the lowest-level stage switches in the data center and may provide network connectivity to hosts. For example, plurality of leaf switches 104 may implement Layer 2 bridging and Layer 3 routing functions. Plurality of spine switches 102 may comprise the next higher level stage switches in the data center and may provide redundant paths and connectivity from a previous lower-level stage switch in plurality of leaf switches 104. Plurality of leaf switches 104 may provide network connectivity to hosts of various tenant virtual networks serviced by the data center. Consistent with embodiments of the disclosure, the hosts may comprise, but are not limited to, Virtual Machines (VMs) (e.g., software modules) running on a service cluster in the data center that are designated into plurality of EPGs 106.

Controller 108 may: i) provide centralized access to all ACI fabric information; ii) optimize the application lifecycle for scale and performance; and iii) support flexible application provisioning across physical and virtual resources. Controller 108 may provide other functionality and is not limited to the aforementioned.

The elements of networking system 100 may be practiced in hardware and/or in software (including firmware, resident software, micro-code, etc.) or in any other circuits or systems. The elements of networking system 100 may be practiced in electrical circuits comprising discrete electronic elements, packaged or integrated electronic chips containing logic gates, a circuit utilizing a microprocessor, or on a single chip containing electronic elements or microprocessors. Furthermore, elements of networking system 100 may also be practiced using other technologies capable of performing logical operations such as, for example, AND, OR, and NOT, including but not limited to, mechanical, optical, fluidic, and quantum technologies. As described in greater detail below with respect to FIG. 4, elements of networking system 100 may be practiced in a computing device 400.

Figure 2:
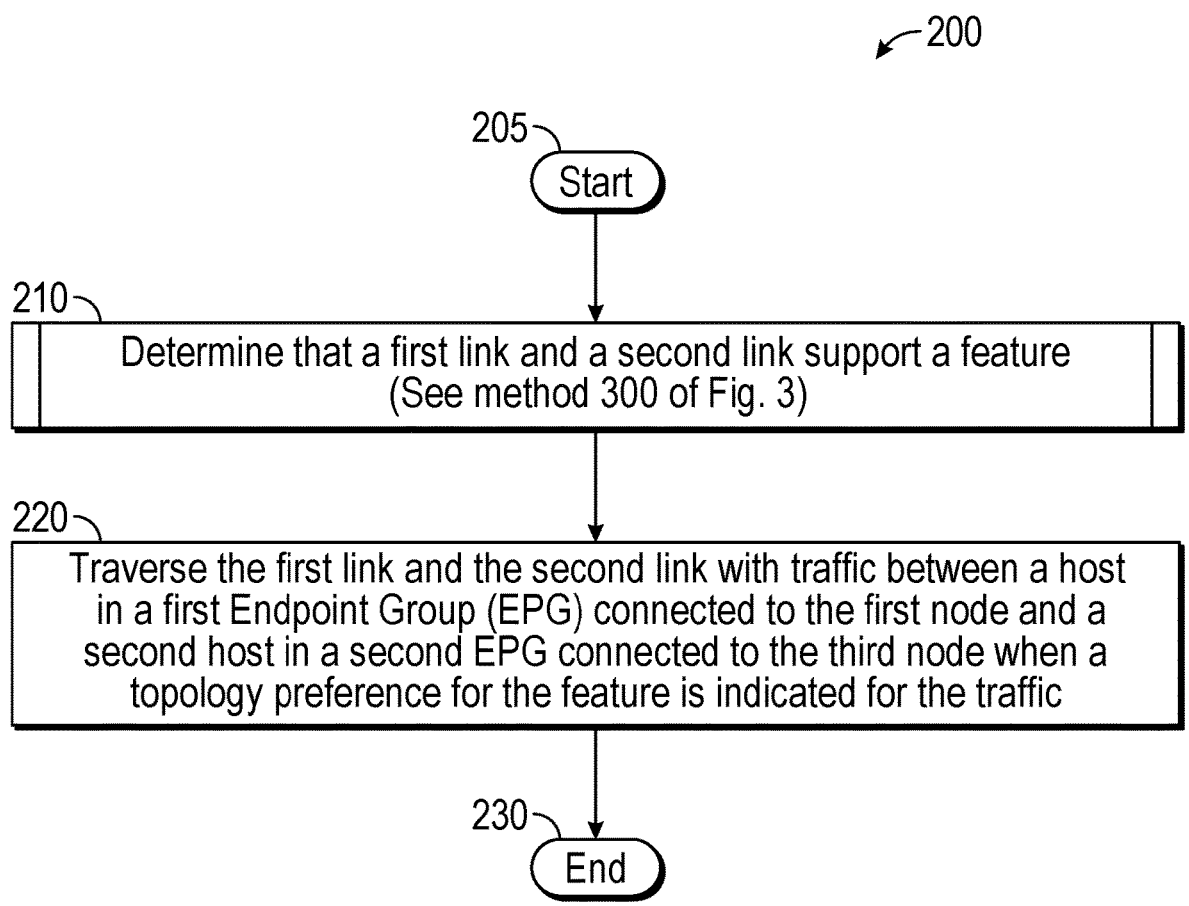
FIG. 2 is a flow chart of a method for providing heterogeneous capabilities.

FIG. 2 is a flow chart setting forth the general stages involved in a method 200 consistent with an embodiment of the disclosure for providing heterogeneous capabilities in an overlay fabric. For example, first spine switch 110, of plurality of spine switches 102, and first leaf switch 116 and second leaf switch 118, of plurality of leaf switches 104, may support a feature. However, second spine switch 112 and third spine switch 114, of plurality of spine switches 102, and third leaf switch 120 and fourth leaf switch 122, of plurality of leaf switches 104, may not support the feature. Accordingly, embodiments of the disclosure may create a topology within networking system 100 comprising first spine switch 110, first leaf switch 116, second leaf switch 118, and the links between them (e.g., a first link 132 and a second link 134) that supports the feature. Consequently, traffic in networking system 100 designated with this feature may flow in this created topology and not flow in other parts of networking system 100. In this way new nodes (i.e., switches) may be added to networking system 100 capable of supporting the feature allowing networking system 100 to support the feature without having to change out all nodes in networking system 100 to support the feature.

Method 200 may be implemented using elements discussed above with respect to FIG. 1. Ways to implement the stages of method 200 will be described in greater detail below. Method 200 may begin at starting block 205 and proceed to stage 210 where it may be determined in networking system 100 that first link 132 and second link 134 support a feature. Stage 210 of method 200 is described in greater detail below with respect to FIG. 3. The feature may comprise, but is not limited to, Media Access Control Security (MACSEC) link encryption, Fiber Channel (FC), or Multi-Site/Remote Leaf connectivity.

For example, in the ACI fabric of FIG. 1, a protocol (e.g., Intermediate System to Intermediate System (ISIS) protocol) may be used by the fabric to provide route reachability for nodes (i.e., plurality of spine switches 102 and plurality of leaf switches 104) within the fabric. Embodiments of the disclosure may add Type Link Values (TLVs) to distribute the node level functions/capabilities (i.e., features) as attributes that may be used for different topological selection. Along with the node attribute, the node may also send the Tunnel Endpoint (TEP) address corresponding to the node for this attribute. Each node along with a regular TEP address also allocates additional TEP addresses for each topology the node should be part of. This information may be distributed on data units (e.g., on ISIS Protocol Data Units (PUDs)) exchanged by the node with its peering nodes in networking system 100.

Using the feature comprising MACSEC as an example, a requirement may be to have a topology of all nodes in networking system 100 and links that support link level encryption. In this example, the TLVs may indicate whether the node supports link encryption, topology ID for link level encryption, and a TEP address for this node on this topology, for example, the data unit may have TLV comprising <NodeID, Feature Capability=MACSEC, Topology ID for the feature, TEP Address for the feature>. On receiving the information, if a peering node supports the feature, it may propagate the data unit further in other links to the other peering nodes. Otherwise, it drops the data unit. In this example, if the data unit is received by a node not capable of supporting MACSEC, it may not send the data unit further down on to its peers thus preventing it from being advertised in general and other topologies that do not support MACSEC. If the node is capable of supporting MACSEC, but certain line card modules or port adaptors associated with the node are not capable of supporting MACSEC, the node may advertise the data unit only out of the links capable of supporting MACSEC.

In the protocol (e.g., ISIS) path selection process, for each topology, the paths may be determined for each TEP advertised on the topology. In the above example for MACSEC, the TEP address representing MACSEC may be reachable from other nodes only through the nodes that support MACSEC. As a result, all links (e.g., first link 132 and second link 134) in this topology may be encrypted.

From stage 210, where it was determined in networking system 100 that first link 132 and second link 134 support the feature, method 200 may advance to stage 220 where first link 132 and second link 134 may be traversed with traffic between a host in first EPG 124 connected to the first node (e.g., first leaf switch 116) and a second host in second EPG 126 connected to the third node (e.g., second leaf switch 118) when a topology preference for the feature is indicated for the traffic. Embodiments of the disclosure may provide underlay mapping to the overlay topology. For example, in the ACI fabric of networking system 100, a host may be mapped into an EPG through various attributes, for example, packet Virtual Local Area Network (VLAN), Media Access Control (MAC) address, Internet Protocol (IP) address.

Additional attributes (i.e., features) may be used on an EPG to indicate the topology preference. Continuing the above example where the feature may comprise MACSEC, if the EPG communication needs to be secure, a topology preference for the feature "MACSEC topology" may be chosen for traffic flows for the communication. When a host is learnt on a leaf switch (e.g., first leaf switch 116), it may be learnt behind the TEP address representing the leaf switch (e.g., first leaf switch 116). If the host is learnt on an EPG that is marked for "MACSEC topology", the host may instead learnt behind the MACSEC TEP address of the leaf switch (e.g., first leaf switch 116). Any traffic forwarding to this host may use the MACSEC TEP address of the leaf switch and hence may only traverse the overlay links (e.g., first link 132 and second link 134) that may be encrypted in the fabric. Traffic to other EPGs on the same leaf switch can continue to use the common TEP address of the leaf switch and hence may be using all the spine links, including the ones that may not be encrypted. This may help when the hosts requiring secure communication may be grouped together and tagged with the "MACSEC topology" feature.

For example, in a shared datacenter environment, Federal Information Processing Standards (FIPS) compliance may be required only by certain tenants (or certain departments within a given tenant like a Government agency). Just like EPGs may be marked secure, Bridge Domain (BD), virtual routing and forwarding (VRF), or Tenant may be marked secure. Any EPG within the corresponding scope (BD/VRF/Tenant) may be learnt behind the TEP address representing MACSEC. MACSEC encryption may be extended to leaf switch ports selectively. So, if a leaf switch front panel port is encrypted, any endpoint learnt behind this leaf switch port can be implicitly marked secure and learnt behind the MACSEC TEP address. This may extend the link encryption from leaf to external links into the fabric links. A host on the same EPG not learnt on an encrypted link may be learnt behind the regular TEP address and the traffic towards this endpoint may not be encrypted.

The mapping for the above example of <Node ID, Topology ID for MACSEC, Node's Location/Physical TEP, Node's MACSEC TEP> may be used by both software and hardware entities to forward appropriately. When the endpoint learning happens and if all the traffic destined to this endpoint needs to be encrypted, the endpoint is learnt behind the "MACSEC TEP" and may be advertised to the other switches through data/control plane. Accordingly, all traffic moves towards the MACSEC TEP.

If however, only some flows towards this endpoint need to be encrypted based on some criteria, this determination cannot be made in the software. In this case, the endpoint may be learnt in software behind the "Nodes' Location/Physical TEP" and advertised so to the other switches. In the hardware table lookups, the topology ID may be selected based on packet fields and using {Topology ID, Destination Node/PTEP} lookup, the Node's "MACSEC TEP" may be fetched and used as the destination of the VxLAN header. The hardware tables that may use the topology ID may comprise the EPG, BD, VRF, Contracts and Netflow tables. When the topology IDs are fetched in multiple lookups as the packet goes through ASIC pipeline, the final topology ID may be fetched through a precedence. This may give fine grained selection of topology. For example, traffic may be encrypted based on a specific contract for a pair of EPGS talking on a certain TCP Port. In this case, a smaller necessary subset of traffic may get encrypted. Hence only fewer spines with this capability may be required in the overlay topology to serve the necessary bandwidth.

Once first link 132 and second link 134 are traversed with traffic between the host in first EPG 124 connected to the first node (e.g., first leaf switch 116) and the second host in second EPG 126 connected to the third node (e.g., second leaf switch 118) when the topology preference for the feature is indicated for the traffic in stage 220, method 200 may then end at stage 230.

Consistent with embodiments of the disclosure, if a node (e.g., a spine switch) supports multiple features (e.g., both MACSEC and Multi Site encapsulation), it may advertise multiple topologies. For the example of supporting both MACSEC and Multi Site encapsulation, the node may advertise three topology IDs and TEPs, for example, TEP1 for MACSEC, TEP2 for Multi Site, and TEP3 representing both. When a leaf switch forwards a traffic on a tunnel leading to a remote site and if the source EPG communication needs to be secure, it may use TEP3/Topology3 anycast address that may load balance the traffic only between a set of spines switches that may support both the features.

For handling multsite/remote leaf routes from another routing domain (e.g., Open Shortest Path First (OSPF)), the capability TLV may be transferred into another protocol attribute. So, when a site advertises its spine's Multsite TEP into OSPF, embodiments of the disclosure may use a special tag in OSPF and when this route may be redistributed from OSPF into ISIS for example, this tag may be converted to a capability TLV of Multi Site with a corresponding Topology ID. While ISIS may comprise the control plane for conveying the capability, prefix, and topology mappings in ACI fabric, it can be replaced with any other mechanism like an SDN controller that programs the topology elements and paths.

Embodiments of the disclosure may also support flow based topology selection. As described above, an EPG may be learnt behind a topology and traffic destined to this EPG chooses the particular topology. However, it may also be desirable to choose a specific topology for a {Source EPG, Destination EPG} pair (or) for a specific flow. This may be useful for supporting flows that consume a lot of bandwidth (e.g., backup, HPC, Map reduce functions) where it may be better to use spine/leaf links with higher bandwidth (e.g., 100G) and also not use a common topology with other flows. Another use case may be to help in isolating a traffic problem in an overlay network. By guiding a flow to a specific overlay topology (e.g., that may be a specific path for a pair of leaf switches), problem isolation may be easier.

To support this scenario, embodiments of the disclosure may add the topology ID in the Policy Table as a contract binding—{Src EPG, Dest EPG, Topology ID}. User contracts may currently provide permit/deny/log/redirect options. In addition, embodiments of the disclosure may have a topology selection option to reach the destination. Once the topology is selected for the flow, a table may be looked up based on {Topology ID, PTEP of the destination} to derive the Virtual TEP representing the topology. PTEP may comprise the TEP address representing the destination node for the traffic. This may ensure that traffic flow may be guided by contracts between two EPGs. Similarly, Topology ID can also be added to the netflow table to redirect specific flows instead of EPG pairs.

Figure 3:
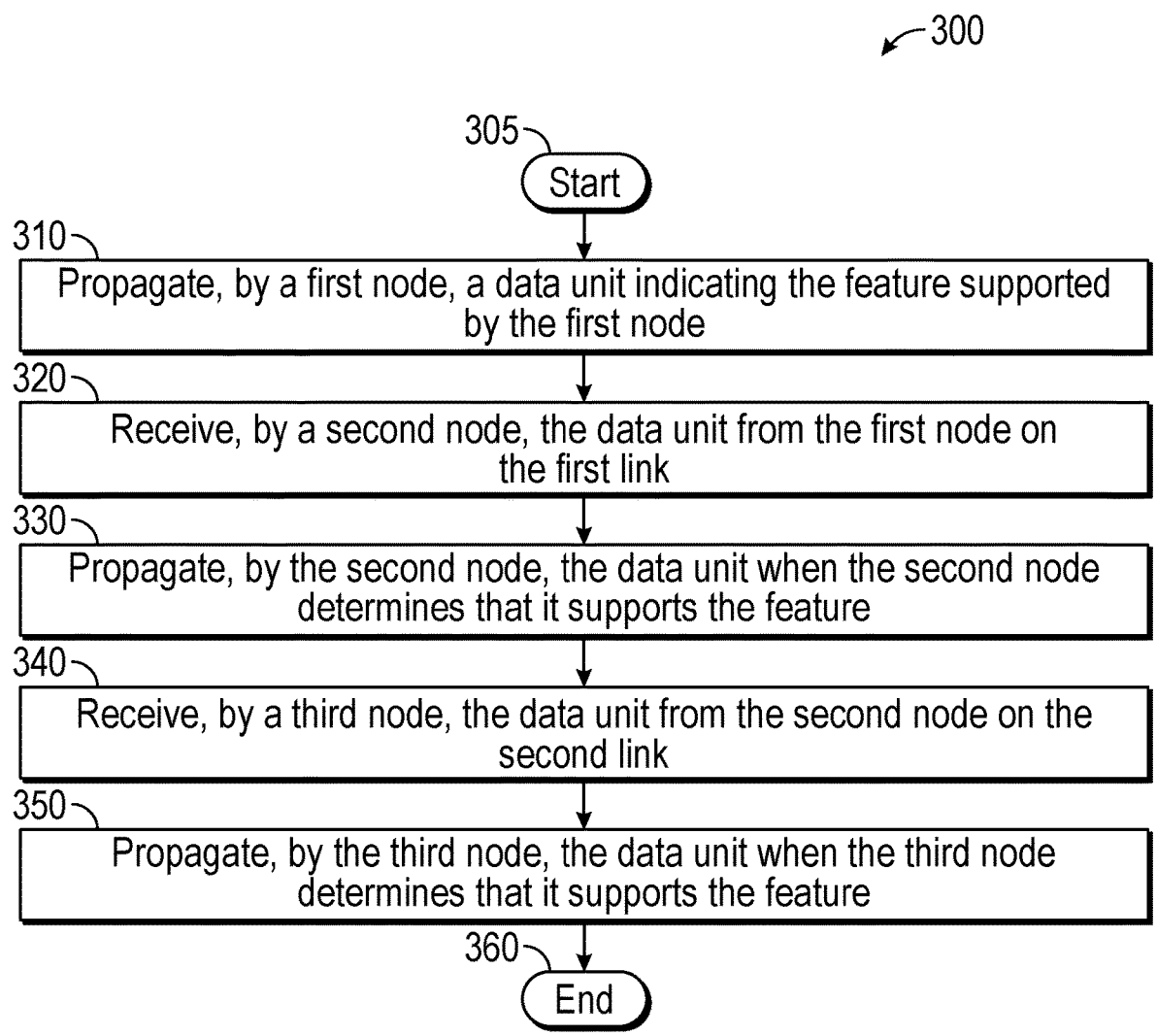
FIG. 3 is a flow chart of a method for determining that a first link and a second link support a feature.

FIG. 3 is a flow chart setting forth the general stages involved in a method 300 consistent with an embodiment of the disclosure for determined, in networking system 100, that first link 132 and second link 134 support a feature from stage 210 of method 200. Method 300 may be implemented using elements discussed above with respect to FIG. 1. Ways to implement the stages of method 300 will be described in greater detail below.

Method 300 may begin at starting block 305 and proceed to stage 310 where the first node (e.g. first leaf switch 116) may propagate the data unit indicating the feature supported by the first node. For example, first leaf switch 116 may propagate the data unit (e.g. comprising a PUD as described above) on all its northbound ports to first spine switch 110, second spine switch 112, and third spine switch 114.

From stage 310, where the first node (e.g. first leaf switch 116) propagates the data unit indicating the feature supported by the first node, method 300 may advance to stage 320 where the second node (e.g., first spine switch 110) may receive the data unit from the first node on first link 132. For example, the data unit may be received by all of the plurality of spine switched 102 connected to the northbound ports of first leaf switch 116 including first spine switch 110.

Once second node (e.g., first spine switch 110) receives the data unit from the first node on first link 132 in stage 320, method 300 may continue to stage 330 where the second node (e.g., first spine switch 110) may propagate the data unit when the second node determines that it supports the feature. For example, while all of the plurality of spine switches 102 connected to the northbound ports of first leaf switch 116 may receive the data unit, not all of the plurality of spine switches 102 may support the feature. Those of the plurality of spine switches 102 that do not support the feature (e.g., second spine switch 112 and third spine switch 114) may drop the data unit. However, those of the plurality of spine switches 102 that support the feature (e.g., first spine switch 110) may propagate the data unit on its southbound ports to second leaf switch 118, third leaf switch 120, and fourth leaf switch 122.

After the second node (e.g., first spine switch 110) propagates the data unit when the second node determines that it supports the feature in stage 330, method 300 may proceed to stage 340 where the third node (e.g. second leaf switch 118) may receive the data unit from the second node on second link 134. For example, the data unit may be received by second leaf switch 118, third leaf switch 120, and fourth leaf switch 122 that are connected to southbound ports of first spine switch 110.

From stage 340, where the third node (e.g. second leaf switch 118) receives the data unit from the second node on second link 134, method 300 may advance to stage 350 where the third node (e.g., second leaf switch 118) may propagate the data unit when the third node determines that it supports the feature. For example, while second leaf switch 118, third leaf switch 120, and fourth leaf switch 122 may receive the data unit, not all of these leaf switches may support the feature. Those of second leaf switch 118, third leaf switch 120, and fourth leaf switch 122 that do not support the feature (e.g., third leaf switch 120 and fourth switch 122) may drop the data unit. However, those of second leaf switch 118, third leaf switch 120, and fourth leaf switch 122 that support the feature (e.g., second leaf switch 118) may propagate the data unit on its northbound ports. In this way it may be determined that the links between the nodes that support the feature are links that support the feature. Once the third node (e.g., second leaf switch 118) propagates the data unit when the third node determines that it supports the feature in stage 350, method 300 may then end at stage 360.

Figure 4:
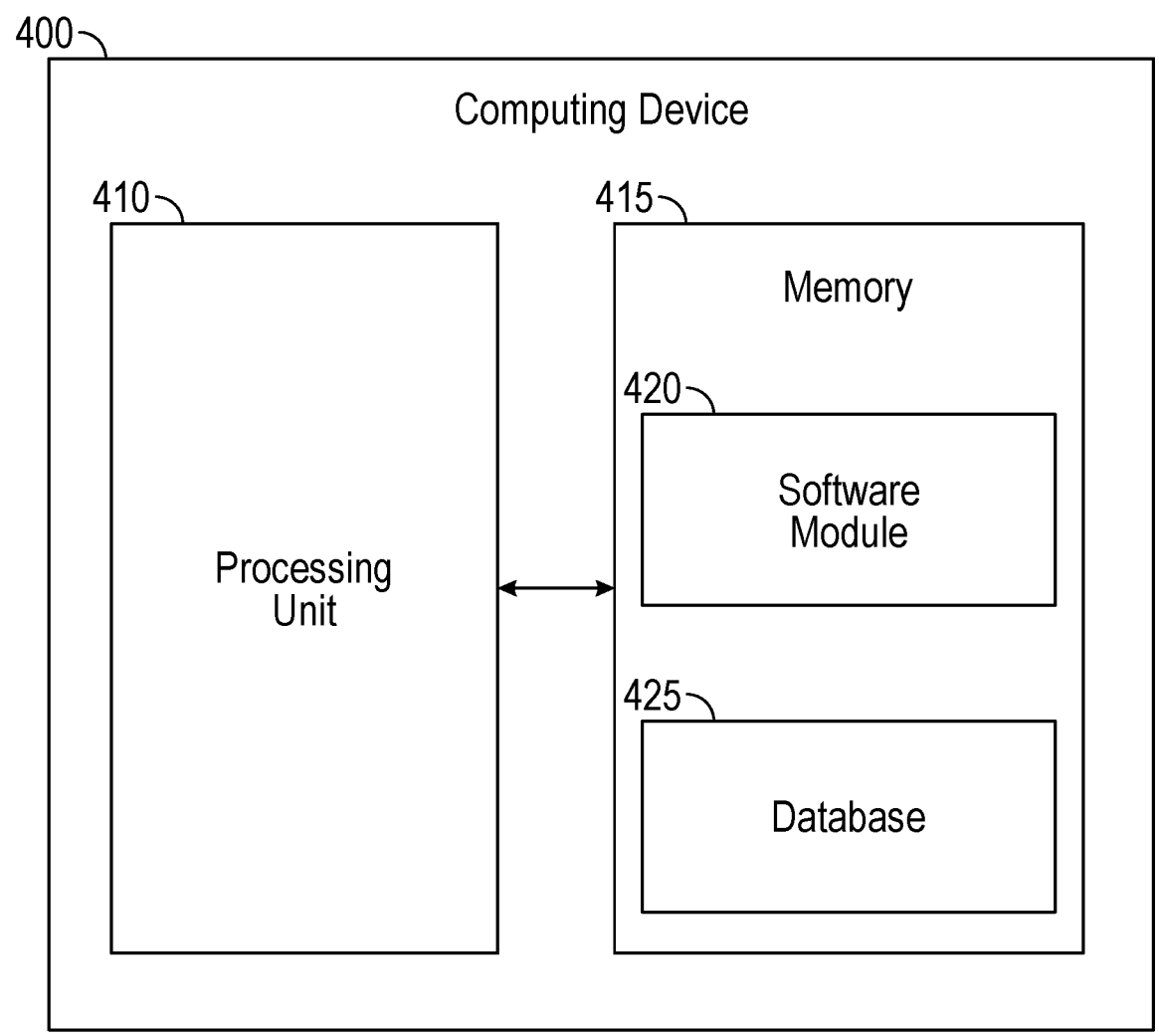
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing heterogeneous capabilities in an overlay fabric, including for example, any one or more of the stages from method 200 described above with respect to FIG. 2 and FIG. 3. Computing device 400, for example, may provide an operating environment for plurality of spine switches 102, plurality of leaf switches 104, or controller 108. Plurality of spine switches 102, plurality of leaf switches 104, or controller 108 may operate in other environments and are not limited to computing device 400.

Computing device 400 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a System-on-a-Chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining that a first link and a second link support a feature, wherein determining that the first link and the second link support the feature comprises;
      propagating, by a first node, a data unit indicating the feature supported by the first node,
      receiving, by a second node, the data unit from the first node on the first link,
      propagating, by the second node, the data unit when the second node determines that it supports the feature,
      receiving, by a third node, the data unit from the second node on the second link, and
      propagating, by the third node, the data unit when the third node determines that it supports the feature, wherein each of the second node and the third node is operative to drop the data unit upon determining that it does not support the feature indicated by the data unit, and wherein determining that the first link and the second link support the feature comprises determining that the first link and the second link support the feature comprising one of the following: Media Access Control Security (MACSEC) link encryption, Fiber Channel (FC), and Multi-Site/Remote Leaf connectivity; and
   traversing the first link and the second link with traffic between a host in a first Endpoint Group (EPG) connected to the first node and a second host in a second EPG connected to the third node when a topology preference for the feature is indicated for the traffic.

2. The method of claim 1, wherein propagating by the first node comprises propagating by the first node comprising a first leaf switch.

3. The method of claim 1, wherein propagating by the second node comprises propagating by the second node comprising a first spine switch.

4. The method of claim 1, wherein propagating by the third node comprises propagating by the third node comprising a second leaf switch.

5. The method of claim 1, wherein propagating, by the first node, the data unit comprises propagating the data unit comprising an Intermediate System to Intermediate System (ISIS) Protocol Data Unit (PUD).

6. The method of claim 1, wherein propagating, by the first node, the data unit comprises propagating the data unit comprising an Intermediate System to Intermediate System (ISIS) Protocol Data Unit (PUD) including Type link values (TLVs) indicating that the first node supports link encryption, a Topology ID for the feature, and a Tunnel Endpoint (TEP) Address for the first node on the topology.

7. A non-transitory computer readable medium which stores instructions which when executed performs a method comprising:
   determining that a first link and a second link support a feature, wherein determining that the first link and the second link support the feature comprises:
      propagating, by a first node, a data unit indicating the feature supported by the first node,
      receiving, by a second node, the data unit from the first node on the first link,
      propagating, by the second node, the data unit when the second node determines that it supports the feature,
      receiving, by the third node, the data unit from the second node on the second link, and
      propagating, by the third node, the data unit when the third node determines that it supports the feature, wherein each of the second node and the third node is operative to drop the data unit upon determining that it does not support the feature indicated by the data unit; and traversing the first link and the second link with traffic between a host in a first Endpoint Group (EPG) connected to a first node and a second host in a second EPG connected to a third node when a topology preference for the feature is indicated for the traffic.

8. The non-transitory computer readable medium of claim 7, wherein:
propagating by the first node comprises propagating by the first node comprising a first leaf switch; and
propagating by the third node comprises propagating by the third node comprising a second leaf switch.

9. The non-transitory computer readable medium of claim 7, wherein propagating by the second node comprises propagating by the second node comprising a first spine switch.

10. The non-transitory computer readable medium of claim 7, wherein propagating, by the first node, the data unit comprises propagating the data unit comprising an Intermediate System to Intermediate System (ISIS) Protocol Data Unit (PUD).

11. The non-transitory computer readable medium of claim 7, wherein propagating, by the first node, the data unit comprises propagating the data unit comprising an Intermediate System to Intermediate System (ISIS) Protocol Data Unit (PUD) including Type link values (TLVs) indicating that the first node supports link encryption, a Topology ID for the feature, and a Tunnel Endpoint (TEP) Address for the first node on the topology.

12. A system comprising:
an Application Centric Infrastructure (ACI) fabric disposed within a data center configured to determine that a first link and a second link support a feature, the data center being configured to determine that the first link and the second link support the feature comprises the data center configured to:

cause a first node to propagate a data unit indicating the feature supported by the first node,
cause a second node to receive the data unit from the first node on the first link,
cause the second node to propagate the data unit when the second node determines that it supports the feature,
cause a third node to receive the data unit from the second node on the second link, and
cause the third node to propagate the data unit when the third node determines that it supports the feature, wherein each of the second node and the third node is operative to drop the data unit upon determining that it does not support the feature indicated by the data unit; and
a host in a first Endpoint Group (EPG) connected to the first node and configured to cause traffic to traverse the first link and the second link to a second host in a second EPG connected to the third node when a topology preference for the feature is indicated for the traffic.

13. The system of claim 12, wherein the first node comprises a first leaf switch.

14. The system of claim 12, wherein the second node comprises a first spine switch.

15. The system of claim 12, wherein the third node comprising a second leaf switch.

16. The system of claim 12, wherein the data unit comprises an Intermediate System to Intermediate System (ISIS) Protocol Data Unit (PUD).

17. The system of claim 12, wherein the data unit comprising an Intermediate System to Intermediate System (ISIS) Protocol Data Unit (PUD) including Type link values (TLVs) indicating that the first node supports link encryption, a Topology ID for the feature, and a Tunnel Endpoint (TEP) Address for the first node on the topology.

* * * * *